Figure 1:
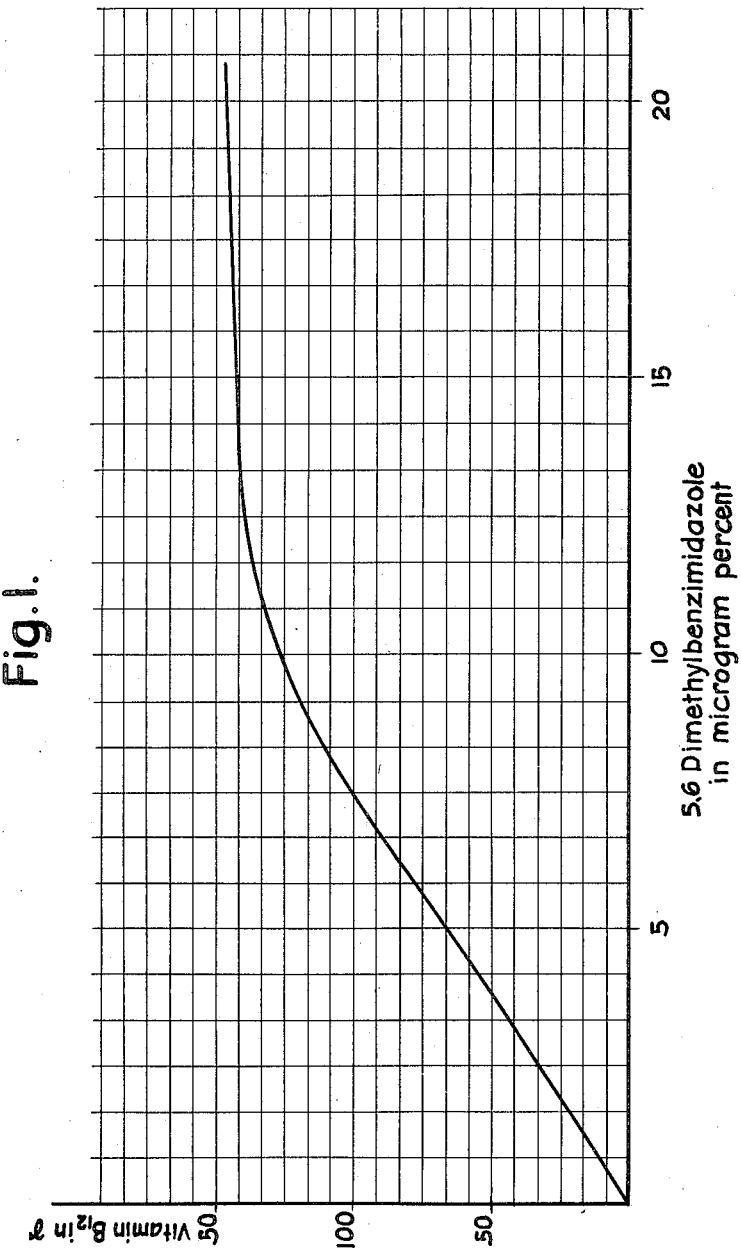

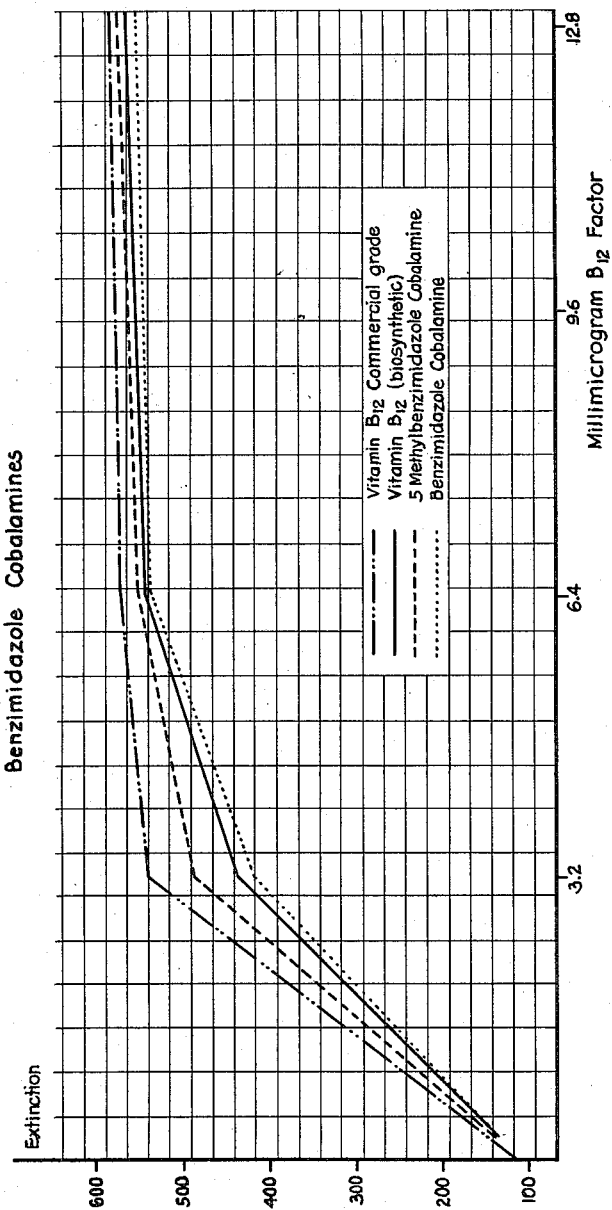

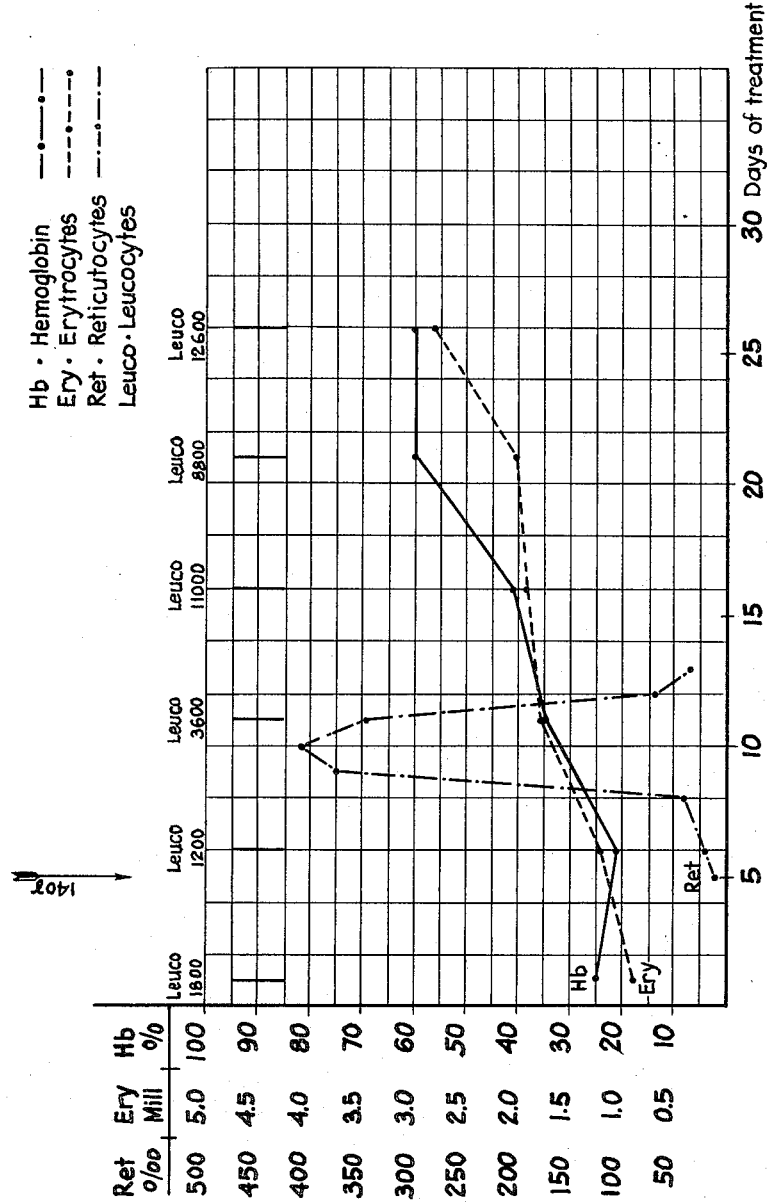

United States Patent Office 2,893,988
Patented July 7, 1959

2,893,988

THERAPEUTICALLY VALUABLE SUBSTANCES PERTAINING TO THE GROUP OF VITAMINS $B_{12}$

Konrad Bernhauer and Wilhelm Friedrich, Aschaffenburg, and Hanswerner Dellweg and Elisabeth Becher, Stockstadt (Main), Germany, assignors to Aschaffenburger Zellstoffwerke Aktiengesellschaft, Redenfelden, Upper Bavaria, Germany, a German corporation Application January 11, 1955, Serial No. 481,234

Claims priority, application Germany, January 11, 1954

16 Claims. (Cl. 260—211.5)

This invention relates to new therapeutically valuable substances pertaining to the group of vitamins $B_{12}$; it relates further to methods for making and isolating the same as well as for separating and distinguishing them from other similar substances.

It is an object of this invention to provide a novel process for making vitamins of the $B_{12}$ group comprising known together with new kinds of these vitamins, which process comprises the biosynthesis of the same with aid of certain microorganisms.

It is another object of this invention to provide new chemical compounds pertaining to the group of $B_{12}$ vitamins.

A further object of the invention is to provide methods for isolating the new kinds of vitamins of the $B_{12}$ group, and separating the same from other kinds of $B_{12}$ vitamins as well as obtaining them in crystallized form.

These new chemical compounds pertaining to the group of $B_{12}$ vitamins contain cobalt, carbon, nitrogen, hydrogen, oxygen and phosphorus together with, eventually, certain other elements such as halogens and the like. The new compounds are soluble in water, simple alcohols, and mixtures of phenolic substances in hydrocarbons, but they are insoluble in acetone and other simple ketones, diethyl ether and other simple ethers, aliphatic and aromatic hydrocarbons and halogenized hydrocarbons. Furthermore they form monocyano complexes which possess a strong absorption maximum at 361 mµ in water at a pH of 6.0. They are distinguished from one another by their distribution coefficients in the system of n-butanol/aqueous ammonium sulphate solution, and in the system of water/p-chlorophenol+trichloroethylene. The new compounds are capable of making possible the growth of the 113–3 mutant of *Escherichia coli*, of *Lactobacillus leichmannii* 313, and of *Ochromanus malhamensis* (Pringsheim); moreover they are active as an "animal protein factor," and therefore make possible the growth of young animals on a diet free from vitamins $B_{12}$. Finally the new compounds possess a pronounced and highly effective potency in the therapeutical treatment of pernicious anemia and other macrocytic anemiae.

The following explanations are given so as to facilitate the understanding of the subsequent part of the specification (see K. Bernhauer and W. Friedrich, Angewandte Chemie 66, 776 (1954)). Various kinds of vitamins $B_{12}$ are known which have been classed as pertaining to the "vitamins of the $B_{12}$ group," which in enlargement to their conventional name, shall hereinafter be called "cobalamines." Among this latter group there may be distinguished "complete" as well as "incomplete" kinds of vitamins $B_{12}$ (or cobalamines) depending on whether they contain a nucleotide or not in their molecule. The "incomplete" types consist essentially of a basic complex containing cobalt, but whose constitution is still unknown, and which shall henceforth be referred to as "etiocobalamine" (derived from the Greek word α'ιτι'α=basis). This term has been chosen to show that these compounds are basic or parent structures contained in the cobalamines, in analogy with the term "etioporphyrin" which designates the basic or parent structure of the various porphyrins.

Experimental results up to the present show that etiocobalamine is contained in all presently known kinds of $B_{12}$ vitamins. Apart from etiocobalamine the complete cobalamines contain also a nucleotide, which makes them "complete" in accordance with the nomenclature adopted. These complete cobalamines show distinct differences in their physical, chemical and biological properties and behavior over the "incomplete" ones, as is revealed by the following comparison:

| | incomplete cobalamines | complete cobalamines |
|---|---|---|
| color at pH 6 | violet (dicyano form). | red (monocyano form). |
| absorption maximum (pH 6) | 367 mµ (dicyano form). | 361 mµ (monocyano form). |
| biological activity on: | | |
| *E. coli* mutant 113–3 | active | active. |
| *L. leichmannii* 313 | inactive | Do. |
| *Ochromonas malhamensis* | do | see below. |
| pernicious anemia | do | Do. |

According to the hitherto obtained experimental results two types of complete cobalamines can be distinguished, which are benzimidazole cobalamines and purine cobalamine, depending on whether the base of the nucleotide moiety belongs to the benzimidazole series or to the purine series. These two types of complete cobalamines are well distinguishable biologically in the following, hitherto known manner:

| | Benzimidazol cobalamines | Purine cobalamines |
|---|---|---|
| *Ochromonas malhamensis* | active | inactive. |
| pernicious anemia | do | Do. |

Due to the fact that purine cobalamines possess no anti-pernicious potency they have also been designated as pseudo-$B_{12}$ vitamins, or ψ-$B_{12}$ factors.

It is our invention to have found a number of new benzimidazole cobalamines as well as a new process for producing the known vitamin $B_{12}$ and with the new benzimidazole cobalamines.

It was found to be unexpectedly possible to achieve a biosynthesis of benzimidazole cobalamines by causing living microorganisms to act on etiocobalamine and benzimidazole, or substituted benzimidazole derivatives, or the corresponding precursors of benzimidazoles such as o-phenylene diamine or substituted o-phenylene diamines from which benzimidazole and its derivatives can be produced. The disclosure following will show that suitable benzimidazole derivatives are those which are at least substituted in 6(5)-position and have their 2-position free from non-oxidized alkyl-groups and their 7(4)-position occupied by hydrogen.

Furthermore we have modified this basic process according to the invention by varying a number of steps thereof in the following manner:

(I) Certain microorganisms are caused to grow in the presence of etiocobalamine and at least one precursor of the benzimidazole series.

(II) A mass of microorganisms (cells in the resting stage) is produced and then caused to act on a solution of etiocobalamine and a precursor of the benzimidazole series.

(III) Microorganisms which are themselves capable of forming etiocobalamine are caused to grow and/or ferment in the presence of a precursor of the benzimidazole series.

In the case of all three variations of the process according to the invention the biosynthetic medium must contain phosphate; moreover, d-ribose may be added to the same.

In the case of variations I and II of the process according to the invention etiocobalamine is added in an isolated form or as a crude solution. In the case of variation III no addition of etiocobalamine is required. In the case of variations I and III growth media are required which permit a satisfactory development or fermentation of the respective microorganisms used, while in the case of variation II the medium in which the biosynthesis of cobalamines is to take place, need only contain etiocobalamine, a precursor as stated, a phosphate, and eventually some d-ribose.

The process according to the invention as varied in case I is carried out in principle in the following way:

A suitable microorganism such as *E. coli* is caused to grow in a conventional manner in a medium which contains a carbon source such as glucose, as well as the necessary nutrient salts. Furthermore etiocobalamine in biological concentrations, i.e. of about 0.1 to 0.3 microgram per cc., corresponding to 10 to 30 microgram percent, are added to the nutrient solutions together with a threefold to tenfold molar excess of a precursor of the benzimidazole series or a preliminary step or mother compound of such a precursor, said molar quantity being based on a molecular weight of etiocobalamine of approximately 900. After sterilizing the nutrient solution and inoculating the same, the inoculated microorganism are caused to grow at a suitable pH value, preferably between 6 and 7, at an optimal temperature, for instance at 37° centigrade under submerged aerobic conditions, i.e. by shaking and/or stirring and simultaneous aeration.

However, etiocobalamine may also be added in alcoholic solution. If this is done, its sterilization by heat becomes superfluous. In the same way the above-mentioned benzimidazole derivatives or their precursors may be added in alcoholic solution.

When *E. coli* is being used it is also possible to work under anaerobic or facultatively anaerobic conditions since this microorganism is capable of growing also under these latter conditions. The process according to the invention should always be carried out under the conditions most suitable to the microorganisms used in each case.

Depending upon the sugar concentration, the growth conditions prevailing in each case, and the kind of microorganisms used, the step of cobalamine formation may be terminated within 8–24 hours. The fermentate is elaborated in the manner as hereinafter described in order to obtain the biosynthetically formed benzimidazole cobalamines as resulting from the conditions chosen for the preceding step.

The second variation of the process according to the invention is carried into practice by first growing the microorganisms to be used for the intended biosynthesis in a conventional nutrient medium which has been chosen according to its suitability for the particular type of microorganisms in question i.e. which will permit a satisfactory growth, without adding further adjuvants, whereupon the resulting mass of microorganisms is isolated, for instance by centrifuging. In a second step of this variation of the process according to the invention, the mass of microorganisms obtained by the aforesaid first step is caused to act on a solution containing etiocobalamine and the corresponding benzimidazole in a phosphate buffer, while agitating the solution for instance by shaking or stirring, for about 10–20 hours at a temperature of about 37° C. This variation of the process permits adding of the initial substances for the reaction in considerably higher concentrations, since the mass of bacteria can also be applied in much greater concentration. In this latter case the subsequent step of isolating the biosynthetically formed vitamin $B_{12}$ factors does therefore not require the elaboration of such large quantities of liquid as is necessary in the process carried out according to the first variation. It has furthermore been found advantageous to add d-ribose to the nutrient medium in this second variation of the process, since d-ribose acts as a precursor in the biosynthesis of the nucleotide moiety of the biosynthetically produced vitamin $B_{12}$ factors, thereby further increasing the yield of the latter.

The third variation of the process according to the invention is carried out by using microorganisms capable by themselves to form etiocobalamine, causing these microorganisms to ferment, and then adding only a precursor of the benzimidazole series in a concentration of, for instance, 50–100 microgram percent to the fermenting microorganisms, and then continuing the fermentation step in the usual manner.

The process according to variations I and III may also be effected by carrying out the growth and the fermentation of the microorganisms in a continuous operation, by growing the microorganisms to be used for the biosynthesis in a fermentation apparatus which is provided with a continuous charging and discharging device. It becomes thereby possible to achieve, for instance, the continuous growth of *E. coli* with a throughput time of approximately 4–5 hours, i.e. the content of the fermentation vessel renewed within that period. The continuously discharged fermentate can thus be elaborated without interruption, which represents an important advantage of the process according to the invention.

Another advantage consists in the possibility of adding continuously a precursor of the benzimidazole series to fresh sludge and subjecting the latter to a sludge digestion process by means of methane fermentation, which is itself a continuous process; the etiocobalamine normally produced in this latter process is thereby converted into benzimidazole cobalamine.

It is yet another advantage of the process according to the invention that the kind of cobalamine produced by the same can be influenced by selecting a predetermined precursor, it thus becoming possible to direct the biosynthesis of the complete cobalamines in such a manner as to obtain the desired products.

A further advantage of variations I and II of the process according to the invention resides in the fact, that in these cases etiocobalamine need not be added in pure form, but that it may be applied as a crude product, in an impure state, or in a mixture with other cobalamines and other impurities.

The benzimidazole cobalamines produced by the above described biosynthetic process can be obtained in principle by one of the methods hereinafter described:

(A) The fermentate obtained as described above, which contains the biosynthetically produced vitamin $B_{12}$ factors, is admixed with 0.1% sodium cyanide or 0.1% sodium bisulphite adjusted to a pH of 6.0, and is then heated to approximately 80° C. for about 30 minutes. The fermentate is then centrifuged. After cooling down to about 20° centigrade the resulting filtrate is agitated while adding 0.5 to 1% charcoal. From the adsorbate on charcoal obtained by means of centrifuging the vitamin $B_{12}$ factors are then eluted, for instance with hot 70% ethyl alcohol. The eluates are then concentrated in vacuo and the vitamins of the $B_{12}$ group extracted therefrom with aid of a solution of 20% p-chlorophenol in o-dichlorobenzene. After washing the p-chlorophenol extracts with a phosphate buffer of pH 7.0 and water, 5 to 8% n-butanol is added to them and they are extracted with water, whereby the vitamins of the $B_{12}$ group are transferred to the aqueous phase. The red-colored aqueous extracts are liberated from traces of organic solvents by treatment in vacuo. Thereupon, 1% kieselguhr or cellulose powder is added to the extracts, they are then acidified to a pH 3.0 and agitated with 2.2% p-chlorophenol, the total amount of vitamins of the $B_{12}$ group present thus being precipitated on the kieselguhr or cellulose in the form of a p-chlorophenol complex. After sucking off the liquid, acetone is added to the red precipitate whereby the p-chlorophenol-$B_{12}$ complex is split, and the vitamins of the $B_{12}$ group are precipitated on the kieselguhr or cellulose present. After renewed sucking-off, the powder containing the vitamins of the $B_{12}$ group is introduced into a chromatographic column. The chromatographic separation taking place in the column varies according to the type of benzimidazoles employed in the biosynthetic process.

(B) The same fermentate as used for the treatment according to method (A) is admixed with 0.1% sodium cyanide or 0.1% sodium bisulphite, is adjusted to a pH of 6.3, and thereafter heated to about 80° C. for approximately 30 minutes. The fermentate is then centrifuged and the centrifugate brought to a pH of 2.5 by adding a 10%-sulphuric acid, whereupon it is sucked off through kieselguhr. After cooling the filtrate down to about 5° C. approximately 1% by volume of bentonite is added thereto in small portions while stirring the filtrate for about half an hour, the filtrate being stirred afterwards for another half hour. Filtration by suction through kieselguhr is then repeated. The completely colorless filtrate which shows only a negligible $B_{12}$ activity, is then discarded. The adsorbate on kieselguhr is eluted with a solution of 2% sodium bicarbonate and 0.1% sodium cyanide or 0.1% sodium bisulphite in water. The process of elution occurs generally in three stages, 200 cc. of the solution to be used for elution being added, for instance, to 15 grams of bentonite (calculated as dry weight) in the first step, 160 cc. of the same solution being added in the second step, and 100 cc. thereof being applied in the third step. Elution takes place in each step at 50 to 55° C. while stirring for about 30 minutes. Thereafter centrifuging follows as the next step in the treatment according to (B). The slightly red-colored eluates are combined and adjusted with sulphuric acid to a pH of 6.5. The extraction of the $B_{12}$ vitamins then takes place by shaking with a mixture of 40 parts of phenol and 60 parts of orthodichlorobenzene. The further purification takes place in the same way as described under (A).

In many cases it is recommendable to insert the following step prior to the chromatographic partition of the $B_{12}$ vitamins:

To the red-colored aqueous extracts obtained according to methods (A) and/or (B), which have been freed from traces of organic solvents by treatment in vacuo, there are added 3%, by volume, of zinc chloride. The extract is then adjusted to a pH of 8.5 by adding sodium hydroxide, and the precipitated zinc hydroxide is removed by sucking off through kieselguhr. The filter cake is repeatedly washed with water having a pH of 8.5 in order to remove all adhering traces of $B_{12}$ vitamins. The filtrate, which is perfectly clear, is adjusted to a pH of 6.5 and the treatment described under (A) is repeated, beginning with the step of extracting with aid of phenol or p-chlorophenol and o-dichlorobenzene until the step of obtaining the kieselguhr product.

The separation of $B_{12}$ vitamins by chromatography on cellulose is carried out in principle in the manner described in our co-pending patent application Serial Number 473,714, filed December 7, 1954, now Patent No. 2,809,148, issued October 8, 1957, and in "Zietschrift für Naturforschung 9b, No. 12, 1954." It is not always possible to achieve crystallization of the biosynthetic vitamin $B_{12}$ factor from the fraction containing the same. In such cases it is advantageous to repeat the chromatography of the fraction in question on aluminium oxide. This is done in the following manner:

The fraction in question consisting of aqueous butanol, which fraction is obtained from the cellulose chromatographic column described in the aforesaid copending patent application S.N. 473,714, is extracted with water. The aqueous phase is concentrated in vacuo in order to remove all remaining alcohol. After adjusting to a pH of 3.0 the adsorbant on kieselguhr of the above-mentioned vitamin $B_{12}$ factor is produced as has been described under (A). As a further step a chromatographic column is charged with a suspension of aluminium oxide in water-free acetone. After the aluminium oxide has settled, the kieselguhr-adsorbed product is added to the supernatant acetone, and the acetone is then caused to descend through the column. The elution of the $B_{12}$ factor is carried out with acetone to which water is added in gradually increasing quantities. Depending upon the type of the $B_{12}$ factor in question elution begins at a water content of from 15 to 40% in the acetone. The eluate thus obtained is concentrated by evaporation in vacuo to the smallest possible volume and is caused to crystallize at approximately 2° C. by adding acetone.

The process for obtaining the $B_{12}$ vitamins may also be carried out in such a manner that, instead of elaborating the entire fermentate, the cells of microorganisms are separated, from their nutrient medium, after biosynthesis has terminated, and that they are thereafter processed alone, i.e. without their nutrient medium, in order to isolate the $B_{12}$ vitamins. For experiments have shown that the $B_{12}$ vitamins are to be found almost exclusively in the cells, so that the negligible quantities contained in the filtrate (the medium) may be disregarded.

The R-values, $R_f$ values and distribution coefficients in certain systems of solvents may be used in principle for distinguishing between the different biosynthetic vitamin $B_{12}$ factors. The R values and $R_f$ values of the various factors are, in fact, not always sufficient for this purpose. However their distribution coefficients in the system water/p-chlorophenol, and particularly in the system n-butanol/ammonium sulphate plus water differ usually so considerably from each other, that they are well suited for differentiating and characterizing the various kinds of biosynthetic $B_{12}$ vitamins.

The following experiments will describe the quantitative process of biosynthesis and the conditions to be maintained during the latter:

The mutant 113-3 as well as a wild strain of *E. coli* were used for the biosynthesis of vitamin $B_{12}$ (5,6-dimethyl benzimidazole cobalamine). These microorganisms are grown in an agitated culture medium being a modification of the Davis medium during 18 hours at about 37° C. The change with time in the quantities of etiocobalamine and 5,6-dimethyl benzimidazole present in the process, as well as the final results of the experiments are shown in the accompanying Table 1 and Figure 1. The vitamin $B_{12}$ synthetized by the two *coli* strains was identified by its R value in the cellulose column, by its distribution coefficient in the biphase system n-butanol/water plus ammonium sulphate, and finally by its microbiological activity on *L. leichmannii* and *Ochromonas malhamensis*.

Table 1 and Figure 1 also disclosed the following:

(1) If neither etiocobalamine nor 5,6-dimethyl benzimidazole are contained in the nutrient medium, no vitamin $B_{12}$ is synthetized.

(2) If the nutrient medium contains 5,6-dimethyl benzimidazole, but no etiocobalamine, no vitamin $B_{12}$ is synthetized either.

(3) If the nutrient medium contains etiocobalamine, but no 5,6-dimethyl benzimidole, only a very small quantity of vitamin $B_{12}$ is formed. The amount of vitamin $B_{12}$ produced in this case corresponds apparently to the quantity of 5,6-dimethyl benzimidazole usually present in the cells anyhow.

(4) If the nutrient medium contains simultaneously etiocobalamine and 5,6-dimethyl benzimidazole, considerable quantities of vitamin $B_{12}$ are being formed.

TABLE I

*Biosynthesis of vitamin $B_{12}$ from etiocobalamine (vitamin $B_{12}$ factor I) and 5,6-dimethyl benzimidazole with aid of Escherichia coli*

[For nutrient medium and test conditions see the specification text.]

| Test No. | Microorganism used | Starting Volume in liters | Percentage of— | | Postdigestive Microbiological Activity against— | | Vitamin $B_{12}$ Factors Determined by Preparative Methods | | | | |
|---|---|---|---|---|---|---|---|---|---|---|---|
| | | | Factor I | Precursor | | | Factor I, R-Value[2] | Vitamin $B_{12}$ formed | | | |
| | | | in medium[1] | | | | | | | | |
| | | | γ percent | γ percent | E. coli mutant 113-3, γ percent | L. leichmannii, γ percent | | in γ[4] (total yield) | in γ percent[4] | R-Value[2] | Distribution Coefficient[3] |
| A | E. coli | 5.0 | 20 | 0 | 13 | 10 | 0.46 | trace | | 0.24 | |
| | | 5.0 | 20 | 20 | 18 | 16 | 0.46 | 231 | 4.6 | 0.23 | 24 |
| B | E. coli mutant 113-3 | 5.0 | 40 | 0 | 36 | 10 | 0.49 | only traces | | | |
| | | 5.0 | 40 | 20 | 28 | 15 | 0.53 | 276 | 5.5 | 0.23 | 24 |
| | | 2.5 | 10 | 0 | 13 | 1 | 0.49 | not determinable | | | |
| C | E. coli | 2.5 | 10 | 5 | 13 | 7 | 0.46 | 67 | 2.7 | 0.24 | 24 |
| | | 2.5 | 10 | 10 | 13 | 9 | 0.42 | 131 | 5.2 | 0.25 | 24 |
| | | 2.5 | 10 | 20 | 12 | 10 | 0.42 | 147 | 5.9 | 0.26 | 24 |
| D | E. coli mutant 113-3 | 2.5 | 0 | 0 | 0 | 0 | | 0 | 0 | | |
| | | 2.5 | 0 | 20 | 0 | 0 | | 0 | 0 | | |
| E | E. coli | 2.5 | 0 | 0 | 0 | 0 | | 0 | 0 | | |
| | | 2.5 | 0 | 20 | 0 | 0 | | 0 | 0 | | |

[1] 5,6-dimethylbenzimidazole.
[2] R-value on cellulose-column; developer used: water-saturated n-butanol containing CN-ions.
[3] Distribution coefficient in the system n-butanol/water plus ammonium sulphate. The figures represent those percentages of ammonium sulphate which correspond to a distribution coefficient of 1. The value 24 is characteristic of cyanocobalamine.
[4] According to microbiological test with *L. leichmannii*.

The rate of conversion of etiocobalamine to vitamin $B_{12}$ cannot be expressed in exact figures as etiocobalamine is not axailable in crystallized form, so that a dosification by weight is difficult to achieve.

The rate of conversion of etiocobalamine to vitamine $B_{12}$ and therewith the yield of the process can be determined in two different ways.

According to the first possible ways the microbiological activity of the $B_{12}$ vitamins against the mutant 113-3 of *E. coli* is used as a basis. Since, however, etiocobalamine possesses only about one third of the activity of vitamin $B_{12}$ (if both are compared at the same optical density, as is further explained below) and since the relative activity of new types of $B_{12}$ vitamins is, of course, originally unknown, this method of determining the conversion rate of etiocobalamine and calculating the yield leads to unreliable results.

It is, therefore, preferable to choose a second way, whereby the quantity of vitamin $B_{12}$ factors is expressed in "optical units" which are defined as follows:

1 cc. of the solution of a vitamine $B_{12}$ factor corresponds to 1 optical unit (hereinafter abbreviated to "O.U.") if, in a U.V. spectrophotometer and with a layer having a thickness of 1 cm., this solution has an extinction of 1.00 at 361 mμ in the case of complete vitamin $B_{12}$ factors, and if it shows the same extinction of 1.00 at 367 mμ in the case of incomplete vitamin $B_{12}$ factors.

The following example will facilitate the understanding of the above statement: 8 cc. of a solution showing an extinction (i.e. an optical density) of 0.2 at 361 mμ (or 367 mμ respectively) corresponds to $0.2 \times 8 = 1.6$ O.U. The general rule that can be derived herefrom is that the quantity of vitamin $B_{12}$ factors expressed in optical units is obtained by multiplying the extinction with the volume (in cc.) of the sample. This signifies that proportionate to its activity in the *coli* test a solution of vitamin $B_{12}$ containing 1 O.U. of the latter corresponds to a quantity of 48 micrograms of crystallized vitamins $B_{12}$ per cc. Proportionate to its activity in the same test a solution of etiocobalamine containing 1 O.U. shows the same activity per cubic centimeter as does a solution of 16 to 17 micrograms of vitamin $B_{12}$ per cc.

This second way of determining the yield is employed in the foregoing specification and in particular in the examples given below, since it represents a reliable method for calculating the yield. When ascertaining the yield it must also be taken into account that we are dealing with a difficult preparative process of elaborating and isolating the biosynthetically formed vitamin $B_{12}$ factors. Experience has taught that in a preparative process of this kind of elaboration hardly more than a yield of 50% of the total quantity of vitamin $B_{12}$ factors can be achieved, since in particular when working with smaller quantities, considerable losses are unavoidable. When taking these facts into account, preparative yields of 30 to 40% of the biosynthetically produced vitamin $B_{12}$ factors, as they are obtained under favorable conditions, must therefore be considered as very satisfactory, since these figures correspond to a conversion rate of etiocobalamine of 60 to 80%.

The conversion rate of etiocobalamine depends on the kind of microorganism used, the selected variation of the process according to the invention, and the type of benzimidazole derivative offered to the microorganism, so that is shows great differences, as is demonstrated in Table 2. As can be seen from Table 1, the *coli* strain I is superior to the *coli* mutant. The examples show that the process when carried out in accordance with variation II yields a considerably higher rate of conversion than it does with variation I. Table 2 also contains the distinguishing characteristics of the new vitamin $B_{12}$ factors.

The new types of $B_{12}$ vitamins show a considerable biological activity. They are effective against *L. leichmannii* and *Ochromonas malhamensis*, i.e. they make possible the growth of these test organisms. As an example, Figure 2 illustrates the potency of benzimidazole cobalamine and 5-methyl benzimidazole cobalamine against *Ochromonas malhamensis* in comparison with vitamin $B_{12}$. The high antipernicious potency, for instance, of 5-methyl benzimidazole cobalamine is illustrated in Figure 3.

The process as above described permits to utilize profitably the quantities of etiocobalamine obtained as a by-product when producing the complete kinds of $B_{12}$ vitamins from digested sludge (in particular vitamin $B_{12}$ itself and the vitamin $B_{12}$ factor III), by converting these quantities in the manner stated to vitamin $B_{12}$ or other new antipernicious and highly active cobalamines.

Furthermore the new process according to our invention may serve to utilize the etiocobalamine produced during the fermentation of digested sludge or other fermentation processes, by adding a benzimidazole to the fermentation, converting the etiocobalamine in this manner into complete benzimidazole cobalamines.

The new process will be still better understood at the hand of the following examples:

Example I 5 liters of a modified Davis medium (1.05% $K_2HPO_4$; 0.45% $KH_2PO_4$; 0.075% sodium citrate; 0.015% $MgSO_4$; 0.15% $(NH_4)_2SO_4$; and 0.3% glucose) containing 20 microgram percent of 5,6-dimethylbenzimidazole are sterilized during 20 minutes at 100° C. whereupon 125 O.U. of etiocobalamine (in a 70%-alcoholic solution) are added thereto. After inoculating the medium with 5 percent of a culture of the *E. coli* mutant 113-3 in peptone/beef-extract/sodium-chloride medium (incubated for 15 hours at 37° centigrade) the whole starting preparation is distributed over a sufficient number of 300 cc. Erlenmeyer flasks, each being charged with 100 cc. of the medium, and then handled in a conventional manner by shaking the culture for 18 hours at 37° C., which causes rapid development of the bacterium.

The fermentate from all the flasks is then combined and treated further in the manner as described under (A). The red-violet colored kieselguhr product which is thereby obtained, is then filled into a cellulose powder/n-butanol/water )column, and the chromatogram forming therein is developed with a water-saturated n-butanol containing cyanide ions. In the eluate of the first zone there appears the unconverted etiocobalamine (R value 0.53), then, after the eluate of a colorless intermediary zone, that of the biosynthetically produced vitamin $B_{12}$ (R value 0.23). The fractions containing the vitamin $B_{12}$ are combined and extracted with water, vitamin $B_{12}$ being transferred to the aqueous phase. After removing n-butanol by evaporation in vacuo, a pure vitamin $B_{12}$ is obtained in aqueous solution. Its absorption spectrum as well as its microbiological activity on *L. leichmanni* and *Ochromonas malhamensis* are identical with those of the known commercial product; its distribution coefficient in the two-phase system n-butanol: water plus ammonium sulphate, which is of the value 1 at an ammonium sulphate concentration of 24%, coincides also with that of commercial vitamin $B_{12}$. The yield of vitamin $B_{12}$ is measured in a Beckmann spectrophotometer of the DU type, and was found to be 5.76 O.U., which were obtained from 125 O.U. of etiocobalamine, thus representing a yield of 4.6%.

Example II 2.5 liters of the same medium as described in Example I, which do, however, contain a total of 15.6 O.U. of etiocobalamine and 10 microgram percent of 5,6-dimethyl benzimidazole are inoculated with 5 percent of a culture of *E. coli* strain I. All other test conditions such as the medium of the inoculated culture, the type and time of incubation, and the elaboration of the finished fermentate are the same as in Example I. The final analysis showed 2.75 O.U. of biosynthetically produced vitamin $B_{12}$ obtained from 15.6 O.U. of etiocobalamine, which corresponds to a yield of 17.5%.

Example III 18.6 liters of the same modified Davis medium as used in Example I, but containing 20 microgram percent of benzimidazole, are sterilized during 20 minutes at 100° C., whereafter 83 O.U. of etiocobalamine (in a 70%-alcoholic solution) are added thereto. After inoculation with 5 percent of a culture of *E. coli* strain I in a peptone/beef-extract/sodium chloride medium (incubated for 15 hours at 37° C.) the growth of the bacterium is continued for 12 hours at 37° C. in a small fermenter while stirring simultaneously with a vibrating mixer and aerating with 3 liters of air per minute.

The fermentate is then treated in the manner described above under (A) until a kieselguhr preparation is obtained which contains the vitamins of the $B_{12}$ group. This product is subsequently chromatographed in a cellulose powder/n-butanol/water column. After the chromatogram has been developed the unconverted etiocobalamine (R value 0.59) appears in the first zone, and then, following a colorless intermediate zone, the new vitamin $B_{12}$ factor which is benzimidazole cobalamine (R value 0.17) in a second zone. The fractions containing the new factor are combined and shaken with water, the new factor passing to the aqueous phase. After removing the butanol in vacuo, a quantity of 23 O.U. of the new factor is obtained in aqueous solution which corresponds to a yield of 27.8%.

Example IV 20 liters of the same medium as used in Example III but containing 20 microgram percent of 5-methyl benzimidazole are sterilized in the usual manner, whereafter 89.2 O.U. of etiocobalamine (in a 70%-alcoholic solution) are added thereto. The inoculating culture, the kind of inoculation used, the fermenting process and the method of elaboration of the fermentate are the same as described in Example III. The final analysis shows 25 O.U. of 5-methyl benzimidazole cobalamine which corresponds to a yield of 28%.

Example V

A culture of *E. coli* strain I whose parent strain had undergone a four-week inoculation period in beef extract agar, is transferred for the purpose of stepwise growth to a test tube containing 5 cc. of peptone water (made up with 1% of peptone, 1% of beef extract, and 0.3% of sodium chloride) whose pH is 6.8 After twelve hours' growth at 37° C. this culture is inoculated into 100 cc. of the same medium, and growth of the bacterium continued therein. The development is further continued in the same way in a volume of 1 liter, and in the final step in 5 liters of the same medium. In this final step propagation is carried out under aeration in a small pre-fermenter.

150 liters of a medium of pH 6.9 containing 0.5% commercial glucose as well as the same salts as in Example I dissolved in softened water, is inoculated with the aforesaid 5 liters of *coli* culture. 940 O.U. of etiocobalamine (in a 70%-alcoholic solution) and 20 microgram percent of 5-methyl benzimidazole are added thereto. In this medium the *coli* culture is caused to grow under aeration with 18 liters per minute of air, and while stirring the same for 12 hours at 37° C.. While the starting preparation shows a vitamin $B_{12}$ activity of 0.14 microgram per cc. when tested against *E. coli*, and no activity at all against *L. leichmannii*, the finished fermentate has an activity of 0.09 microgram per cc. when tested against the latter.

The fermentate is then chromatographed in the same way as described in Example I. After the chromatogram has been developed, the first zone to appear is that of unconverted etiocobalamine, thereafter a colorless zone, and finally the new biosynthetic vitamin $B_{12}$ factor are obtained. The fractions containing the new factor are combined and extracted by shaking with water, the new factor passing to the aqueous phase. After removing butanol in vacuo, the new factor is obtained in aqueous solution in a quantity of 230 O.U. It has the properties shown in Table 2, which distinguish it from other kinds of $B_{12}$ vitamins. The aqueous solution is concentrated to a small volume by evaporation in vacuo, and then fractionated by adding staggered quantities of acetone. At first only the impurities flocculate and are removed. The new vitamin $B_{12}$ factor crystallizes finally when an acetone content of about 90% has been reached. When tested in several severe cases of pernicious anemia the crystallized product showed an excellent therapeutical effect.

*Example VI*

9 liters of a modified Davis medium of pH 6.9 having the same composition as in Example I are sterilized for 30 minutes at 100° C. and then inoculated as in Example I with 5 percent of a parent culture of *E. coli* strain I. The parent culture is prepared by an 8 hours' incubation of the *coli* strain at 37° C. in a medium containing 1% of peptone, 1% of beef extract, 0.3% of sodium chloride, and 0.2% of disodium phosphate. After having been inoculated the 9 liters of the aforesaid modified Davis medium are incubated under aeration through a glass frit G2 with 2 liters of air per minute during 8 hours at a temperature of 37° C. thereby causing vivid growth of the bacterium. The mass of the latter is then centrifuged under sterile conditions, a bacterium mass having a moist weight of 30 grams and a dry weight content of 29% being obtained.

The moist bacterium mass thus obtained is thoroughly homogenized in 1.5 liters of a sterile phosphate buffer of pH 7 with aid of a vibrator. (The phosphate buffer contains 1.05% $K_2HPO_4$ and 0.45% $KH_2PO_4$.) A total of 48 O.U. of etiocobalamine (in a 70%-alcoholic solution), 100 microgram percent of 5,6-dimethyl benzimidazole, and 200 microgram percent of d-ribose are then added to the aforesaid suspension. The latter is then distributed in batches of 100 cc. in fifteen 300-cc. Erlenmeyer flasks, and then incubated by shaking during 24 hours at 37° C.

The fermentate obtained in this manner is united and elaborated by the method described above under (B). Chromatography is carried out in the same manner as described in Example I. An analysis of the finally obtained aqueous fractions showed 3.86 O.U. of unconverted etiocobalamine, and 19.4 O.U. of vitamin $B_{12}$ which corresponds to a yield of 40% of vitamin $B_{12}$. In proportion to the total amount of cobalamines isolated, 83% are thus present in the form of vitamin $B_{12}$ (5,6-dimethyl benzimidazole cobalamine) and 17% as unconverted etiocobalamine.

*Example VII*

The same quantity of bacteria of the same *E. coli* strain as in Example VI is produced and transferred in the same manner as in that example to a sterile phosphate buffer. After adding 42 O.U. of etiocobalamine in a 70%-ethyl alcohol solution, 3 milligrams of d-ribose, and 1.5 milligrams of 4,6-dimethyl benzimidazole, the mixture is treated during 24 hours at 37° C. in the same manner as described in Example VI. When chromatographing the kieselguhr preparation in the same way as described above, a first zone of unconverted etiocobalamine is obtained whose R value is 0.45. Thereafter a second zone appears which contains the new factor whose R value is 0.19. After re-chromatographing this second zone, which now shows an R value of 0.29, it is extracted by shaking with water; butanol is then removed in vacuo, and the new vitamin $B_{12}$ factor is obtained as a pure aqueous solution of 4,6-dimethyl benzimidazole cobalamine in the amount of 9 O.U. Its properties are described in Table 2.

*Example VIII*

The production of a bacterium mass and its transfer to a sterile phosphate buffer is carried out in the same manner as described in Example VI. After adding 42 O.U. of etiocobalamine, 3 mg. of d-ribose, and 1.5 mg. of 5,6-diethyl benzimidazole, the mixture is treated during 24 hours at 37° C. as described above. When chromatographing the kieselguhr preparation in a cellulose/n-butanol column there is mainly obtained a zone having an R value of 0.44. The preparation is then chromatographed on aluminum oxide using aqueous acetone as an eluting agent. When the water content in acetone has reached 12%, the unconverted etiocobalamine migrates off as a violet-colored zone. As soon as the water content is increased beyond 20%, a red eluate containing the new vitamin $B_{12}$ factor (5,6-diethyl benzimidazole cobalamine) is obtained, which, when transferred to an aqueous solution, yield 8.5 O.U. of the pure factor, whose properties are shown in Table 2.

*Example IX*

A bacterium mass is produced and transferred to a sterile phosphate buffer as described in Example VI. After adding 42 O.U. of etiocobalamine, 3 mg. of d-ribose, and 1.5 mg. of 5-chloro-6-methyl benzimidazole, the preparation is treated during 24 hours at 37° C. as described above. In a chromatographic cellulose/n-butanol column a first zone of unconverted etiocobalamine having an R value of 0.5, and a second zone having an R value of 0.33 and consisting of 5-chloro-6-methyl benzimidazole cobalamine are obtained. After re-chromatographing in cellulose (R value 0.46) the new factor is obtained pure in aqueous solution. The yield is 3.2 O.U. The properties of the new factor are shown in Table 2.

*Example X*

A bacterium mass is produced and transferred to a sterile phosphate buffer as described in Example III. After adding 42 O.U. of etiocobalamine, 3 mg. of d-ribose, and 1.5 mg. of benzimidazole 5-carboxamide, the preparation is treated during 24 hours at 37° C. as described above. Chromatography in a cellulose/n-butanol column leads to the formation of two zones, one of which shows an R value of 0.5 and contains the unconverted etiocobalamine, while the second one, having an R value of 0.06, contains the new vitamin $B_{12}$ factor. After extracting the respective fraction by shaking with water, and after removal of the dissolved butanol by evaporation in vacuo, the new factor is obtained pure in aqueous solution to an amount of 9 O.U. The properties of the new factor are described in Table 2.

*Example XI*

A bacterium mass is produced and transferred to a sterile phosphate buffer as described in Example VI. After adding 42 O.U. of etiocobalamine, 3 mg. of d-ribose, and 1.5 mg. of 1,2-diamino-4,5-dimethylbenzene, the preparation is treated as described above. In a cellulose/n-butanol column two zones are formed which it is difficult to separate. The first of these zones contains unconverted etiocobalamine having an R value of 0.45, while the second zone, of an R value of 0.36, contains the new vitamin $B_{12}$ factor. After re-chromatographing this second zone in a cellulose column (R value now 0.43) and transfer to an aqueous solution, the new factor is obtained pure in the amount of 9.5 O.U.

Example XII

A larger quantity of bacteria of the *E. coli* strain I is produced in the following way: Analogous to Example V, a culture of *E. coli* strain I is developed by a plurality of steps. One liter of a suspension of bacteria obtained in a medium comprising 1% of peptone, 1% of beef extract, 0.3% of sodium chloride, and 0.2% of disodium phosphate, and having a pH of 6.8, by growing the same for 8 hours at 37° C., is used as an inoculating culture. Five liters of the aforesaid medium are inoculated with this culture and are incubated in a small prefermenter for 8 hours at 37° C. with aeration. The resulting culture is used for inoculating 150 liters of a medium comprising 2% of commercial glucose, 1.5% of $NaH_2PO_4$, 0.075% of sodium citrate, 0.15% of ammonium sulphate, and 0.015% of magnesium sulphate, the pH of the medium being adjusted to 6.8. In this medium the *coli* culture is developed during 8 hours at 37° C., while aerating the same at a rate of 18 liters of air per minute. The mass of the bacterium is then centrifuged under sterile conditions. 1300 grams of moist weight containing a dry matter content of 30% is obtained.

800 grams of the moist bacterium mass obtained in the above described manner are added to 15 liters of sterile phosphate buffer of the same composition as described in Example VI, in a 20-liter flask. Furthermore, 100 microgram percent of 5,6-diethyl benzimidazole, 200 microgram percent of d-ribose, and 420 O.U. of etiocobalamine are added thereto, and the entire preparation is then homogenized in a vibrator. Incubation takes place subsequently during 24 hours at 37° C. while aerating at the rate of 3 liters of air per minute.

The fermentate obtained from two identical starting preparations is combined so as to form a total volume of 30 liters, and after adding 30 grams of sodium cyanide and adjusting the pH to 6.8, the fermentate is heated during 30 minutes to 80° C. After cooling down the fermentate is centrifuged. Additional impurities are precipitated from the opaque centrifugate after acidifying to a pH of 2.5, and are removed by further centrifuging. Finally a completely clear, yellow-colored solution is obtained which is cooled down to 5° C. The further elaboration comprises the following steps:

(a) ADSORPTION ON BENTONITE 300 grams of bentonite are added in small portions to the well cooled solution of 30 liters mentioned above, during half an hour and while stirring the solution constantly. After the last portion of bentonite has been added, stirring is still continued for another half hour. The adsorbate on bentonite settles well and is separated from the supernatant liquid by decanting through a kieselguhr filter. The completely clear filtrate is discarded. The adsorbate is eluted by introducing into 2 liters of an aqueous solution of 2% sodium bicarbonate plus 0.1% sodium cyanide and stirring the mixture for half an hour at 55° C. After centrifuging, a clear eluate of reddish-brown color is obtained. This step is repeated three to four times, until the eluate shows only a negligible vitamin $B_{12}$ activity.

(b) FIRST EXTRACTION WITH PHENOL

The combined eluates (7 liters) are adjusted to a pH of 6.8 and extracted with a mixture of 40 parts of phenol and 60 parts of o-dichlorobenzene (total extract 1200 cc.). The red-brown colored extract is washed twice with each time 200 cc. of 1.5%-phosphoric acid, once with 200 cc. of $\frac{1}{15}$-molar phosphate buffer of pH 7, and twice with each time 200 cc. of water. The washing liquids show no vitamin $B_{12}$ activity and are discarded. Subsequently 120 cc. of butanol are added to the organic phase, whereafter the $B_{12}$ vitamins can be extracted by shaking with water. The aqueous extract is washed with 100 cc. of diethyl ether in order to remove phenol and dichlorobenzene therefrom, and is finally concentrated by evaporation in vacuo, the alcohol being removed simultaneously therewith.

(c) PRECIPITATION WITH ZINC ION

The resulting red solution (550 cc.) is further elaborated by adding 10 grams of zinc chloride thereto. Sodium hydroxide is then added until a pH of 8.5 is reached, and the precipitated zinc hydroxide, which occludes a large share of the organic impurities, is removed by suction filtration through kieselguhr. The precipitate is washed with water having a pH of 8.5 until it is completely colorless.

(d) SECOND EXTRACTION WITH PHENOL

It is not possible to carry out a precipitation with p-chlorophenol in the solution (800 cc.) resulting from the preceding step on account of the high salt concentration present in the same. Therefore the extraction is repeated with a total volume of 600 cc. phenol (40 parts) and o-dichlorobenzene (60 parts), the lower phase formed after separation in two layers, is washed with water, and 100 cc. of butanol are added. Finally the vitamins of the $B_{12}$ group are extracted with a total volume of 600 cc. of water. After washing with diethyl ether and concentration in vacuo, 560 cc. of a solution of pure red color are obtained. Determination with the *coli* test yields 17.9 milligrams, the *L. leichmannii* test 11.2 milligrams; determination in the spectrophotometer yields 403 O.U.

(e) PRECIPITATION WITH p-CHLOROPHENOL

In order to carry out this precipitation the solution is adjusted to a pH of 3.0 and thoroughly shaken with 5 grams of kieselguhr and 12.4 grams of p-chlorophenol. The red flakes formed in the solution are filtered off through kieselguhr, suspended in acetone, and so much of the latter added that the supernatant liquid does not show any longer a red coloration. The precipitate is then filtered, washed with acetone, and dried.

(f) CHROMATOGRAPHY ON CELLULOSE

The product adsorbed on kieselguhr is filled into a cellulose column and compressed firmly by stamping. Water-saturated n-butanol containing 0.005% of HCN forms a suitable developing agent. When developing the column, small quantities of a few slowly migrating zones as well as one red-violet main zone (351 O.U.; corresponding to about 86.5% of the total yield) are obtained, the latter main zone migrating through the column with an R value of 0.55. This zone contains a mixture of unchanged etiocobalamine together with the new biosynthetic factor. The butanol eluate of this zone is extracted with water and the alcohol removed therefrom in vacuo, a volume of 130 cc. being obtained. Precipitation with p-chlorophenol and washing of the precipitate with acetone follow in the same way as described above.

(g) CHROMATOGRAPHY ON ALUMINUM OXIDE

For separating the aforesaid two components the kieselguhr precipitation, which is still moist with acetone, is filled into a column charged with aluminum oxide. Acetone containing approximately 0.005% of HCN is used as an eluting agent, to which increasing quantities of water are added. At a mixture ratio of 15 parts of water and 85 parts of acetone a violet zone emerges from the column, which zone is pure etiocobalamine (220 O.U., corresponding to 54.5% of the total yield). At a mixture ratio of 25 parts of water to 75 parts of acetone the new vitamin $B_{12}$ factor emerges from the column as a red zone (118 O.U. corresponding to 29.5% of the total yield).

The eluate is concentrated by evaporation in vacuo to a volume of from 1 to 2 cc., to which about 60 cc. of acetone are added. After standing for three days at 2° C., the new factor has crystallized from the mother liquor in the form of thin, brilliantly red-colored needles. The supernatant liquid is cautiously decanted, the crystals are dissolved in 1 to 2 cc. of water, acetone being added again until crystallization is complete. The yield of 5,6-diethyl benzimidazole cobalamine amounts to about 5 milligrams.

Example XIII 750 grams of a bacterium mass of *E. coli* strain I having a dry weight content of 29% and having been grown in the same manner as described in Example XII, are suspended in the same way as in the aforesaid example in 15 liters of a phosphate buffer which contains 100 microgram percent of benzimidazole 5-carboxylic amide, 200 microgram percent of di-robose, and 420 O.U. of etiocobalamine. Incubation takes place during 24 hours at 37° C., as in Example XII, while aerating and stirring the preparation with a vibrating mixer.

The further elaboration of the starting preparation takes place in the same manner as described in Example XII: Steps (a) Adsorption on Bentonite, and (b) First Extraction with Phenol are identical with those of Example XII.

The precipitation with zinc ion is not applied in this example. Instead the solution, which has been previously concentrated by evaporation in vacuo, is directly precipitated with p-chlorophenol, which corresponds to step (e) in Example XII. The kieselguhr preparation is suspended in acetone, filtered, and dried. Then follows step (f) Chromatography on Cellulose.

The kieselguhr preparation is chromatographed in a cellulose column with water-saturated n-butanol containing 0.005% of HCN, as described in Example XII. Two zones are being formed. The first zone is of violet color and has an R value of 0.44. It contains the unconverted etiocobalamine (138 O.U., 80% of the total yield). The second, red-colored zone migrates through the column with an R value of 0.07 (36.2 O.U., 20% of the total yield). Its eluate is extracted with water, alcohol is removed therefrom by evaporation in vacuo, and the vitamin $B_{12}$ components are precipitated on kieselguhr by adjusting to a pH of 3 and adding 2.2% of p-chlorophenol. The kieselguhr preparation is washed with acetone and then re-chromatographed on cellulose under the same conditions as described above. This chromatographic partition leads again to the formation of two red-colored zones. The first one has an R value of 0.11 (24 O.U., 13% of the total yield), and the second one an R value of 0.06 to 0.07 (13 O.U., 7% of the yield). Both substances are eluted and collected separately. After transferring them into water, distilling off the alcohol, and precipitating with p-chlorophenol, the kieselguhr preparations obtained from both substances are re-chromatographed on aluminum oxide.

(g) CHROMATOGRAPHY ON ALUMINUM OXIDE

When chromatographed on aluminum oxide, each one of the two aforesaid red-colored substances yields only one red zone which can be eluated with a mixture of 75 parts of acetone and 25 parts of water in the presence of 0.005% of HCN. The two resulting eluates are concentrated in vacuo to approximately 1 cc., 50 cc. of acetone are added thereto, and the preparation is left standing in a refrigerator until crystallization occurs. The substance whose R value in the cellulose column is 0.11, crystalizes in thin, pointed needles, while the other substance whose R value is 0.06, forms thicker, shorter needles.

Example XIV

Two batches of 900 grams each of a bacterium mass of the *E. coli* strain I having a dry weight content of 28.5% and being produced in the same way as described in Example XII, are suspended in the same manner, each batch in 15 liters of a sterile phosphate buffer, containing in each volume of 15 liters 100 microgram percent of 1,2-diamino-4,5-dimethylbenzene, 200 microgram percent of d-ribose, and 420 O.U. of etiocobalamine. Incubation is carried out in the same way as in Example XII.

The resulting fermentate whose volume is 30 liters, is elaborated in the same way as described in Example XIII.

Chromatography is carried out as described in step (f) of Example XII. However, three zones appear on the column. The first one, of violet color, migrates at an R value of 0.47 (252 O.U., 87% of the total yield), and contains unconverted etiocobalamine. The second, red-colored zone has an R value of 0.25 (27.9 O.U., 9.6% of the yield) in the chromatogram. This zone contains the produced vitamin $B_{12}$ factor. The third zone having an R value of 0.08 (3.5% of the yield) is of violet color. It contains probably a further conversion product from etiocobalamine, which occurs in almost every one of these tests in small quantities, and is probably identical with one of the C factors described by other authors. The eluate leaving the column with an R value of 0.25, is extracted in the usual manner in water and concentrated in vacuo (70 cc.).

PRECIPITATION WITH ZINC ION
(Corresponds to (c) in Example XII)

Further purification is carried out by adding 1.4 grams of zinc chloride and precipitating zinc hydroxide by adding sodium hydroxide until a pH of 8.5 is reached, as described in Example XII. After filtering and washing the precipitate, the filtrate is agitated with kieselguhr and p-chlorophenol in order to precipitate the vitamin $B_{12}$ component corresponding to step (e) in Example XII.

Chromatography on aluminum oxide is the next following step, and corresponds to step (g) in Example XII. The kieselguhr preparation so obtained is chromatographed on aluminum oxide. At a mixture ratio of 80% of acetone and 20% of water in the presence of HCN, a red-colored eluate is obtained which is concentrated in vacuo to a volume of about 1 cc. In order to prepare the purified new vitamin $B_{12}$ factor acetone is added to the concentrate until it begins to turn turbid, whereupon the liquid is left standing in a refrigerator until crystallization occurs. The formed product is obtained in thin, pointed needles. Its properties are shown in Table II.

TABLE II

*Biosynthesis of vitamin $B_{12}$ factors by action of E. coli strain I on etiocobalamine and a "precursor" of the benzimidazole series and/or the o-phenylenediamine series in the presence of d-ribose and phosphate*

| | Yield in Optical Units* | | | Biosynthetic Vitamin $B_{12}$ Factors | | | | | |
|---|---|---|---|---|---|---|---|---|---|
| | | | | R-value with— | | $R_f$ value (c) | distribution coefficient 1 in the system | | |
| | unconverted etiocobalamine | biosynthetic "complete" $B_{12}$ factor | other $B_{12}$ factors | (a) | (b) | | A | | B |
| | | | | | | | Percent p-Chlorophenol | | Percent Ammonium Sulphate |
| 5,6-Dimethylbenzimidazole | 3.86 | 19.4 | | 0.25 | 0.27 | 0.28 | 7.8 | | 24.0 |
| 5-Methylbenzimidazole | | | | 0.25 | | 0.27 | 8.6 | | 28.0 |
| Benzimidazole | | | | 0.17 | | 0.27 | 9.4 | | 31.0 |
| 4,6-Dimethylbenzimidazole | 28.9 | 10.8 | | 0.29 | | 0.28 | 8.0 | | 25.0 |
| 5,6-Diethylbenzimidazole | 220.0 | 118.0 | | 0.44 | | 0.34 | 6.9 | | 16.0 |
| 5-Chloro-6-methylbenzimidazole | 19.0 | 3.64 | | 0.46 | | 0.31 | 7.9 | | 22.5 |
| 5,6-Dichlorobenzimidazole | 3.9 | 18.9 | | | 0.53 | 0.34 | | | 19.5 |
| Benzimidazole-5-carbonic amide | 138.0 / 138.0 | 24.0 / 12.0 | | 0.11 / 0.06 | | 0.21 / 0.20 | 12.7 | | 39.0 / 43.5 |
| 2-hydroxy-methyl-benzimidazole | 21.8 | 1-2 | 2.5 | | 0.20 | | | | (30) |
| Benzimidazole-2-carbonic acid | 15.45 | 6.3 | | 0.19 | 0.18 | 0.27 | | | 31.0 |
| Benzimidazole-2-carbonic amide | 15.30 | 1-2 | 2.6 | 0.19 | 0.19 | | | | (30) |
| 5-methyl-2-hydroxymethylbenzimidazole | 13.75 | 1.2 | 9.7+1.85 | | 0.23 | | | | (27) |
| 5-methylbenzimidazole-2-carbonic acid | 10.5 | 17.6 | 1.15 | 0.20 | 0.23 | 0.27 | | | 28.0 |
| 5-methylbenzimidazole-2-carbonic amide | 12.7 | 1-2 | 5.95+2.0 | 0.20 | 0.23 | | | | (27) |
| 5,6-Dimethyl-2-hydroxymethylbenzimidazole | 16.5 | 1-2 | 2.75+3.1 | | 0.27 | | | | |
| 5,6-Dimethylbenzimidazole-2-carbonic acid | 17.2 | 3.0 | 3.4+2.4 | 0.23 | 0.28 | 0.28 | | | 24.5 |
| 5,6-Dimethylbenzimidazole-2-carbonic amide | 13.6 | 3.73 | 6.5+2.0 | 0.25 | 0.27 | 0.27 | | | 24.0 |
| 5-methylbenzimidazole-2,6-dicarbonic amide | 20.5 | 2.1 | 6.8 | | 0.14 | 0.17 | | | 42.0 |
| 1,2-diamino-4,5-dimethylbenzene | 11.2 | 11.0 | | 0.25 | 0.27 | 0.25 | 7.8 | | 24.0 |
| 1,2-diamino-3,4-dimethylbenzene | 26.4 | 1.5 | | | 0.27 | 0.31 | | | 23.0 |

Remarks:
(a)=n-butanol, water-saturated and containing +0.005% HCN.
(b)=secondary butanol with 23% water, saturated with potassium perchlorate and containing +0.01% HCN.
(c)=secondary butanol, water-saturated and containing +0.01% HCN.
A=p-chlorophenol in trichloroethylene and water.
B=n-butanol water plus ammonium sulphate.
*=after chromatographic separation, expressed in "optical units" measured at an absorption maximum of 361 mμ (complete $B_{12}$ factors) and 367 mμ (incomplete $B_{12}$ factors).

Example XV

The same quantity of bacteria of the same *E. coli* strain as in Example VI is produced and transferred in the same manner as in that example to a sterile phosphate buffer. After adding 42 O.U. of etiocobalamine in a 70%-ethyl alcohol solution, 3 milligrams of d-ribose, and 15 milligrams of 5,6-dichloro-benzimidazole, the mixture is treated during 24 hours at 37° C. in the same manner as described in Example VI. Chromatography of the kieselguhr product is carried out in a cellulose column. As developing agent a mixture of 77% sec. butanol and 23% water is used, which contains 0.01% hydrocyanic acid and is saturated with crystallized potassium perchlorate. Two zones were formed which did not separate completely. The first of these zones is violet and contains unconverted etiocobalamine, having an R-value of 0.56, while the second immediately following zone of an R value of 0.53 is red and contains the new vitamin $B_{12}$ factor. This second zone is re-chromatographed in an aluminum oxyd column, using aqueous acetone as eluting agent. At a mixture ratio of 12 parts of water and 88 parts of acetone a small violet zone of etiocobalamine migrates at first. At a mixture ratio of 20 parts of water to 80 parts of acetone there is obtained a red eluate of the new vitamin $B_{12}$ factor (5,6-dichloro-benzimidazole cobalamine). The eluate is concentrated by evaporation in vacuo to about 1 cc. to which 20 cc. of acetone are added. After standing for 1 day at 2° C. the new factor has crystallized in thin, pointed needles. Its properties are shown in Table II.

Example XVI

The same quantity of bacteria of the same *E. coli* strain as in Example VI is produced and transferred in the same manner as in that example to a sterile phosphate buffer. After adding 42 O.U. of etiocobalamine in a 70%-ethyl alcohol solution, 3 milligrams of d-ribose, and 1.5 milligrams of 2-hydroxymethyl-benzimidazole or 1.5 milligrams of benzimidazole-2-carbonic acid or 1.5 milligrams of benzimidazole-2-carbonicacid-amide, the mixture is treated during 24 hours at 37° C. in the same manner as described in Example VI. Chromatography is effected as described in Example XV by using an eluting mixture of sec.butanol and water (77:23). In all cases a first violet zone of unconverted etiocobalamine is obtained, whose R value is 0.57 to 0.60. Thereafter a second zone appears, whose R value is 0.18 to 0.20 and which is in all cases the same vitamin $B_{12}$ factor (benzimidazole cobalamine). After transfer to an aqueous solution the new vitamin $B_{12}$ factor is present in pure state in an amount of 2.6 to 6.0 O.U. The properties of the new factor are shown in Table II.

Example XVII

The production of bacterium mass and its transfer to a sterile phosphate buffer is carried out in the same manner as described in Example VI. After adding 42 O.U. of etiocobalamine, 3 milligrams of d-ribose, and 1.5 milligrams of 5-methyl-2-hydroxymethyl-benzimidazole or 1.5 milligrams of 5-methyl-benzimidazole-2-carbonic acid or 1.5 milligrams of 5-methyl-benzimidazole-2-carbonic acid-amide, the mixture is treated during 24 hours at 37° C. in the same manner as described in Example VI. Chromatography is effected as described in Example XV. In all cases a first violet zone of unconverted etiocobalamine, having an R value of 0.57 to 0.60 and a second red zone having an R value of 0.23 are obtained. After transfer to an aqueous solution the new factor is present in a pure state in an amount of 17.6 O.U. in the case of 5-methyl-benzimidazole-2-carbonic acid and in an amount of 2 O.U. in both the other cases. In all cases the same vitamin $B_{12}$ factor (5-methyl-benzimidazole cobalamine) is produced. For properties see Table II.

*Example XVIII*

A bacterium mass is produced and transferred to a sterile phosphate buffer as described in Example VI. After adding 42 O.U. etiocobalamine, 3 milligrams of d-ribose, and 1.5 milligrams of 5,6-dimethyl-2-hydroxy-methyl-benzimidazole or 5,6-dimethyl-benzimidazole-2-carbonic acid or 5,6-dimethyl-benzimidazole-2-carbonic acid-amide, the preparation is treated during 24 hours at 37° C. as described above. In a chromatographic cellulose column a first violet zone of unconverted etiocobalamine appears in all cases whose R value is 0.57 to 0.59. Thereafter a second zone emerges whose R value is 0.27 to 0.28 and which is in all cases the same vitamin $B_{12}$ factor. After transferring to an aqueous solution the vitamin $B_{12}$ (5,6-dimethyl-benzimidazole cobalamine) is present in a pure state in an amount of 3.0 to 3.7 O.U. For identification see Table II.

*Example XIX*

A bacterium mass is produced and transferred to a sterile phosphate buffer as described in Example VI. After adding 42 O.U. of etiocobalamine, 3 milligrams of d-ribose, and 1.5 milligrams of 5-methyl-benzimidazole-2,6-dicarbonic acid-amide, the mixture is treated during 24 hours at 37° C. as described above. Chromatography is effected as described in Example XV. The first violet zone contains unconverted etiocobalamine and has an R value of 0.60. Thereafter a very weak, red zone whose R value is 0.26, then a stronger red zone whose R value is 0.14 and at last a violet zone, whose R value is 0.06, are following. The zone, having the R value of 0.14 contains the new vitamin $B_{12}$ factor. After transferring into an aqueous solution the new factor is obtained pure in an amount of 2.1 O.U. Properties are described in Table II.

*Example XX*

The production of a bacterium mass and its transfer to a sterile phosphate buffer is carried out as in Example VI described. After adding 42 O.U. of etiocobalamine, 3 milligrams of d-ribose, and 1.5 milligrams of 1,2-diamino-3,4-dimethyl-benzene, the mixture is treated during 24 hours at 37° C. as described above. Chromatography is effected as described in Example XV. The unconverted etiocobalamine appears as a violet zone having the R value of 0.54. Thereafter a second violet-red zone emerges which contains the new factor with an R value of 0.27. After removing of butanol in vacuo the new vitamin $B_{12}$ factor is obtained as a pure aqueous solution in the amount of 2.35 O.U. Its properties are described in Table II.

We claim:

1. A vitamin $B_{12}$ analog comprising a nucleotide moiety containing a member of the benzimidazole series, characterized in that said member is selected from the group consisting of benzimidazole and those members of the benzimidazole series which are at least substituted in 6(5)-position and have their 2-position free from non-oxidized alkyl-groups and their 7(4)-position occupied by hydrogen, and in which at least one of the positions 5 and 6 is free from chlorine.

2. A vitamin $B_{12}$ analog as described in claim 1, characterized in that said member is selected from the group consisting of benzimidazole, 6(5) methyl-benzimidazole, 6(5)-carboxamido-benzimidazole, and 5,6 diethyl-benzimidazole, said vitamin $B_{12}$ analog exhibiting an antipernicious anemia effect.

3. The compound 6(5) carboxamido-benzimidazole cobalamine.

4. The compound 6(5)-methyl-benzimidazole cobalamine.

5. The compound benzimidazole cobalamine.

6. A cobalamine compound obtained from 4,6-dimethyl-benzimidazole.

7. The compound 5,6-diethyl-benzimidazole cobalamine.

8. A process for the biosynthetic production of vitamin $B_{12}$ and analogs thereof, comprising the step of causing live strains of microorganisms present in fermented sewage sludge containing *Escherichia coli*, and capable of synthesizing vitamin $B_{12}$ to act, in an aqueous medium containing a phosphate buffer and having a pH between 6 and 7, on etiocobalamine and a vitamin $B_{12}$ nucleotide moiety-builder selected from the group consisting of benzimidazole and those members of the benzimidazole series which are at least substituted in 6(5)-position and having their 2-position free from non-oxidized alkyl-groups and their 7(4)-position unsubstituted and those orthophenylene diamine derivatives from which said strains are capable of producing the corresponding member of the benzimidazole series, in the presence of d-ribose.

9. A process according to claim 8, characterized in that the said microorganisms are grown in a nutritious medium in the presence of etiocobalamine and said member of the benzimidazole series.

10. A process according to claim 8, characterized in that the said microorganisms are first grown in a nutritious medium for said microorganisms and thereafter mixed with and thereby made to act on a solution of etiocobalamine and said member of the benzimidazole series.

11. A process according to claim 8, characterized in that the said microorganisms present in fermented sewage sludge which microorganisms are capable of forming etiocobalamine are grown in a nutritious medium for said microorganisms in the presence of said member of the benzimidazole series.

12. A process according to claim 8, characterized in that etiocobalamine, and the member of the benzimidazole series, respectively, are added in alcoholic solution.

13. A process for the biosynthetic production of vitamin $B_{12}$, comprising the steps of preparing an aqueous nutrient solution containing a phosphate buffer and 5,6-dimethyl-benzimidazole, sterilizing the same, adding thereto d-ribose and a sterile solution of etiocobalamie, inoculating the resulting medium with a culture of *Escherichia coli*, maintaining a pH between 6 and 7 in the medium, causing the microorganism to grow so as to ferment said medium, and separating and isolating the resulting vitamin $B_{12}$.

14. A process for the biosynthetic production of vitamin $B_{12}$ and analogs thereof, comprising the steps of preparing an aqueous nutrient solution containing phosphate buffer and a vitamin $B_{12}$ nucleotide moiety-builder selected from the group consisting of benzimidazole and those members of the benzimidazole series, which are at least substituted in 6(5)-position and having their 2-position free from non-oxidized alkyl groups and their 7(4)-position unsubstituted and those ortho-phenylenediamine derivatives from which live strains of microorganisms present in fermented sewage sludge containing *Escherichia coli* and capable of synthesizing vitamin $B_{12}$ are able to produce the corresponding member of the benzimidazole series, sterilizing the nutrient solution, adding thereto d-ribose and a sterile solution of etiocobalamine, inoculating the resulting medium with a culture of one of said live strains, maintaining a pH between 6 and 7 in the medium, causing said strain to grow so as to ferment said medium and separating and isolating the resulting compound of the vitamin $B_{12}$ group.

15. A process for the biosynthetic production of vitamin $B_{12}$ and analogs thereof, comprising the steps of growing a live strain of microorganisms containing *Escherichia coli* present in fermented sewage sludge and capable of synthesizing vitamin $B_{12}$ in an aqueous nutrient medium, harvesting the resulting bacterial mass from the nutrient medium by separation, suspending said bacterial mass in a sterile phosphate buffer, adding thereto d-ribose, a sterile solution of etiocobalamine and a vitamin $B_{12}$ nucleotide moiety-builder selected from the group consisting of benzimidazole and those members of the benzimidazole series which are at least substituted in 6(5)-position and having their 2-position free from non-oxidized alkyl-groups and their 7(4)-position unsubstituted and those ortho-phenylenediamine derivatives from which said strains are capable of producing the corresponding member of the benzimidazole series, maintaining a pH between 6 and 7 in the medium, causing said strain in the resting stage to act in the resulting suspension so as to form compounds of the vitamin $B_{12}$ group therein, and separating and isolating the latter.

16. A process for the biosynthetic production of vitamin $B_{12}$ and analogs thereof, comprising the steps of growing a live strain of microorganisms present in fermentated sewage sludge and capable of forming etiocobalamine and synthesizing during the fermentation compounds of the vitamin $B_{12}$ group from the formed etiocobalamine after addition of a vitamin $B_{12}$ nucleotide moiety-builder selected from the group consisting of benzimidazole and those members of the benzimidazole series which are at least substituted in 6(5)-position and having their 2-position free from non-oxidized alkyl-groups and their 7-(4)-position unsubstituted and those ortho-phenylene-diamine derivatives from which said microorganisms are capable of producing the corresponding member of the benzimidazole series, causing said strains to act in the fermenting sewage sludge in the presence of a phosphate buffer and di-ribose, so as to form said compounds of the vitamin $B_{12}$ group therein, and separating and isolating the latter.

References Cited in the file of this patent
UNITED STATES PATENTS

| | | |
|---|---|---|
| 2,563,794 | Rickes | Aug. 7, 1951 |
| 2,595,499 | Wood | May 6, 1952 |
| 2,650,896 | McDaniel | Sept. 1, 1953 |
| 2,738,302 | Kaczka | Mar. 13, 1956 |
| 2,796,383 | Robinson | June 18, 1957 |

OTHER REFERENCES

Bernhauer: Angewandte Chemie, vol. 66, December 21, 1954, pp. 776–780.

Beaven: J. of Phar. and Pharmacol., vol. 2, December 1950, pp. 944–955.